United States Patent

Karbanowicz et al.

[11] Patent Number: 5,538,184
[45] Date of Patent: Jul. 23, 1996

[54] $CO_2$ SNOW DISCHARGE APPARATUS

[75] Inventors: Michael Karbanowicz, West Pennant Hills; Michael Bishop, Castle Hill, both of Australia

[73] Assignee: The Commonwealth Industrial Gases Limited, New South Wales, Australia

[21] Appl. No.: 291,157

[22] Filed: Aug. 16, 1994

[30] Foreign Application Priority Data

Aug. 18, 1993 [AU] Australia .................... PM0679

[51] Int. Cl.[6] ............................................. F25C 1/00
[52] U.S. Cl. .................... 239/14.2; 239/172; 239/450
[58] Field of Search .......................... 239/14.2, 2.2, 239/172, 722, 450, 536; 285/188, 25, 286

[56] References Cited

U.S. PATENT DOCUMENTS

| | | | |
|---|---|---|---|
| 1,760,323 | 5/1930 | Shelton | 285/188 X |
| 2,093,240 | 9/1937 | Holmquist | 239/536 X |
| 2,435,448 | 2/1948 | Kraeft et al. | 285/286 X |
| 2,621,075 | 12/1952 | Sedar | 239/450 |
| 2,719,210 | 9/1955 | Chapman | 285/286 X |
| 3,243,857 | 4/1966 | McWilliams | 285/188 |
| 4,267,972 | 5/1981 | Bryant | 239/536 X |
| 4,781,122 | 11/1988 | Foulard et al. | 266/207 X |
| 4,915,362 | 4/1990 | Borasci et al. | 266/207 X |
| 5,343,491 | 8/1994 | Herren et al. | 373/8 |

FOREIGN PATENT DOCUMENTS

| | | |
|---|---|---|
| 613424 | 1/1991 | Australia . |
| 0274290 | 11/1987 | European Pat. Off. . |
| 0318352 | 11/1988 | European Pat. Off. . |
| 0544967 | 11/1991 | European Pat. Off. . |
| 2489841 | 9/1989 | France . |
| 490521 | 5/1955 | Italy ................... 285/188 |

*Primary Examiner*—William A. Cuchlinski, Jr.
*Assistant Examiner*—Lesley D. Morris
*Attorney, Agent, or Firm*—R. Hain Swope; David A. Draegert; Larry R. Cassett

[57] ABSTRACT

A carbon dioxide snow discharge apparatus having at least two snow discharge tubes wherein at least two of the snow discharge tubes have different internal diameters which can be operated either individually or together to vary the flow rate of the carbon dioxide snow, the snow discharge tubes being joined at selected points along their length.

10 Claims, 1 Drawing Sheet

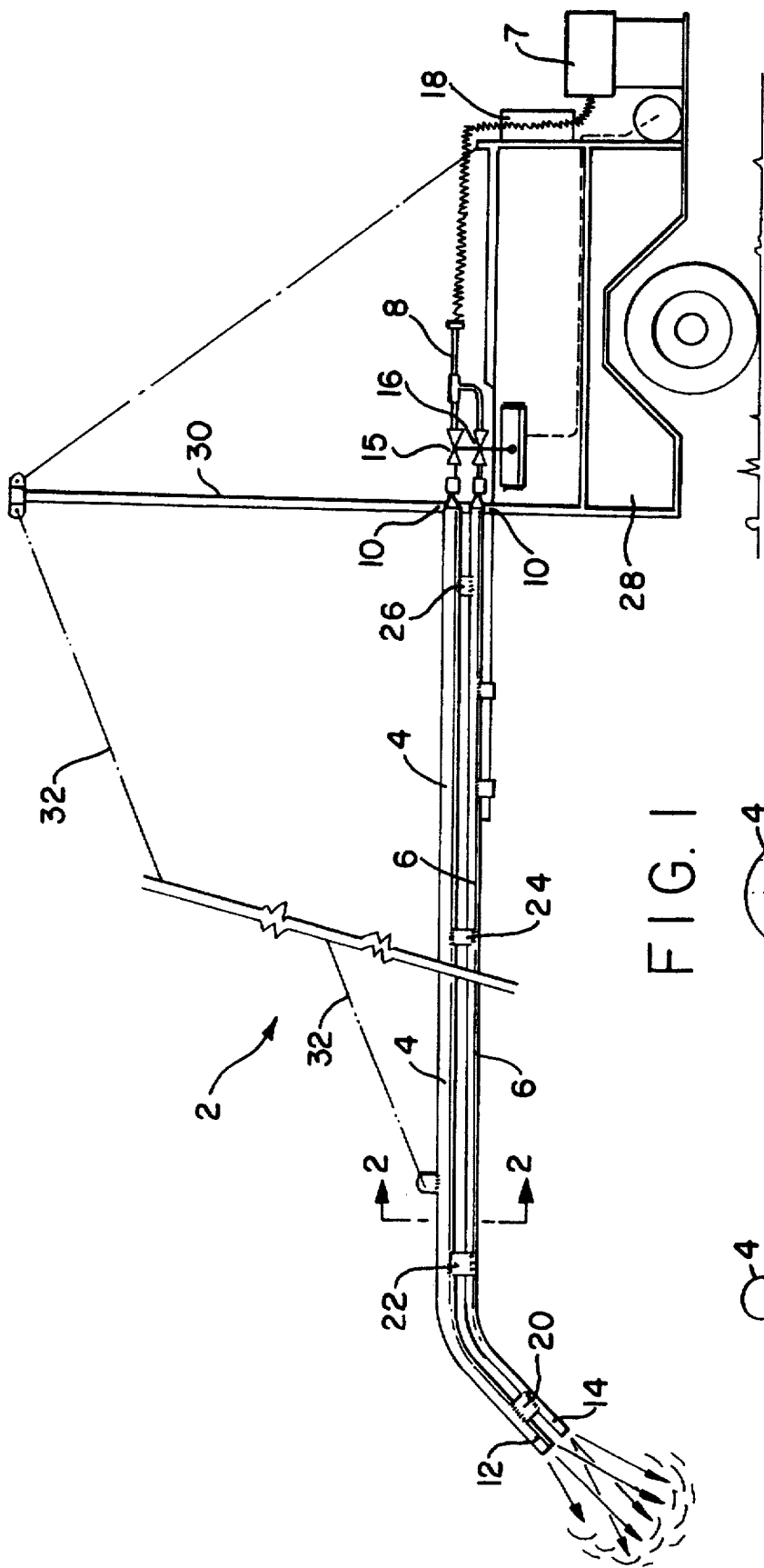
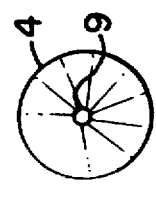
FIG. 1
FIG. 2
FIG. 3

CO₂ SNOW DISCHARGE APPARATUS

TECHNICAL FIELD

The present invention relates to a carbon dioxide snow discharge apparatus which can be used to prevent oxidation of molten metal.

BACKGROUND OF THE PRIOR ART

When molten metal contacts atmospheric air, oxides and nitrides are formed which create fumes and can reduce the metallurgical purity of the metal. In the past a number of techniques have been used to shield the molten metal and thereby prevent the formation of oxides and nitrides. For example, covering powders have been spread on the surface of the molten metal to provide a barrier which isolates the molten metal from the atmosphere. This technique is clearly ineffective when the molten metal is poured in which case the problems of oxidation and fume generation remain.

More recently, carbon dioxide snow has been used to shield molten metal from atmospheric gases because it has beneficial effects over other types of industrial gases. In practice, carbon dioxide snow is produced by expanding liquid carbon dioxide through a nozzle to atmospheric pressure. The resulting snow is then injected through a discharge tube to the desired location.

It has been found that if the velocity of the carbon dioxide snow is too low, little or no snow reaches the surface of the molten metal because of a lack of jetting action. It has also been found that if the velocity of the carbon dioxide snow is too high, air is entrained within the snow. The presence of entrained air results in ineffective shielding. In addition, thermal exchange occurs between the hot air and the snow which results in untimely sublimation of the snow.

It has also been found that if the velocity of the carbon dioxide snow exiting the discharge tube is too high there results very poor snow production. This is because the carbon dioxide snow initially forms as very small pin point sized flakes. At very high velocities the pinpoint sized flakes do not increase in size and tend to sublimate before effective shielding occurs. At lower velocities the pin point sized flakes merge to give snow flakes of sufficient size to resist untimely sublimation.

As a result of the criticality of the velocity of carbon dioxide snow exiting the discharge tubes, the snow discharge tube is dimensioned to provide a desirable outlet velocity. More specifically, the velocity of the carbon dioxide snow flakes must be sufficient to provide the required kinetic energy for projecting or spraying the carbon dioxide snow to the desired location (e.g. the surface of the molten metal). In addition, it is necessary to avoid aspiration of air which can result in an untimely sublimation of a portion of the carbon dioxide snow which can adversely affect shielding efficiency.

Discharge tubes with a given internal diameter allow flow rates which are selected to provide the optimum velocity of the carbon dioxide snow passing therethrough for a given application. A given snow discharge tube therefore can operate only over a limited range of velocities. Thus, if different flow rates are required for different applications, it may be necessary to shut down the apparatus and change one or more of the discharge tubes. This procedure adds to the cost of operating the carbon dioxide snow discharge apparatus.

SUMMARY OF THE PRESENT INVENTION

According to the present invention there is provided a carbon dioxide snow discharge apparatus comprising at least two snow discharge tubes adapted to be selectively operated either individually or in combination for discharging carbon dioxide snow therefrom, liquid carbon dioxide supply means, and expansion means for receiving the liquid carbon dioxide from the supply means and for expanding the liquid carbon dioxide to form carbon dioxide snow.

Preferably, there are at least two snow discharge tubes having different internal diameters with the most preferred embodiment of the invention employing two snow discharge tubes, each having a different internal diameter. In the latter embodiment, the smaller diameter snow discharge tube can be operated alone when a relatively low flow rate of carbon dioxide snow is desired. The larger diameter snow discharge tube can be operated alone when a relatively moderate flow rate is desired, and both snow discharge tubes can be operated in combination when a relatively high flow rate is desired.

Preferably, the snow discharge tubes are juxtaposed in parallel relationship. Adjacent tubes are preferably joined by conventional means such as by brackets at selected points along their respective lengths. The discharge tubes are thereby advantageously made rigid and stable without the need for separate supports over greater lengths of tubing as compared with adjacent tubes which are not so joined. This arrangement is particularly advantageous where the location of carbon dioxide snow delivery is relatively inaccessible.

BRIEF DESCRIPTION OF THE DRAWINGS

The following drawing is illustrative of an embodiment of the invention and is not intended to limit the invention as encompassed by the claims forming part of the application.

FIG. 1 is a side elevational view of an embodiment of the present invention utilizing two discharge tubes;

FIG. 2 is a cross-sectional view taken along line 2—2 of FIG. 1; and

FIG. 3 is a front view of the nozzle and orifice of a discharge tube employed in the present invention.

DETAILED DESCRIPTION OF THE INVENTION

Referring to the drawing, there is illustrated a carbon dioxide snow discharge apparatus 2 comprising two snow discharge tubes 4 and 6 adapted to be selectively operated either individually or in combination. It will be understood that more than two such tubes can be employed.

Each snow discharge tube 4, 6 is adapted to receive liquid carbon dioxide from a reservoir 7 via a conduit 8. The discharge tubes 4 and 6 also each include an expansion nozzle 10 having an orifice 9 through which liquid carbon dioxide is expanded to atmospheric pressure to convert the liquid carbon dioxide to carbon dioxide snow. It has been found that the optimum ratio of the size of the orifice 9 to the internal diameter of the discharge tubes 4 and 6 is about 1:12.5 for liquid supply pressures of about 1200 to 1500 kPa as shown in FIG. 3. The preferred range for the ratio is from about 1:9 to 1:15. Once the carbon dioxide snow is formed it is then discharged from the respective distal ends 12, 14 of the snow discharge tubes 4, 6.

Valves 15 and 16 are provided intermediate the conduit 8 and the discharge tubes 4 and 6 for controlling the rate of flow of the liquid carbon dioxide. The valves 15 and 16 are conventionally actuated electrically, pneumatically or by other suitable means via a control cabinet 18.

The snow discharge tubes 4 and 6 are juxtaposed and run parallel to each other. They are joined by conventional means such as by welded brackets at selected points along their length (e.g. at points 20, 22, 24 and 26). This arrangement provides a surprisingly advantageous rigid and stable construction which allows the tubes 4 and 6 to remain unsupported over greater lengths than conventional arrangements.

In the illustrated embodiment of FIG. 1, the snow discharge tubes 4 and 6 are mounted on a trailer 28 and are additionally supported by a post 30 and stay system 32. The snow discharge apparatus is thereby rendered portable and may be moved from one location to another.

Although the invention has been described with reference to a specific example, it will be appreciated by those skilled in the art that the invention may be embodied in many other forms.

We claim:

1. A carbon dioxide snow discharge apparatus comprising at least two snow discharge tubes adapted to be selectively operated either individually or in combination for discharging carbon dioxide snow therefrom, wherein at least two of the snow discharge tubes have different internal diameters, liquid carbon dioxide supply means, and expansion means for receiving liquid carbon dioxide and for expanding the liquid carbon dioxide to form carbon dioxide snow.

2. The carbon dioxide snow discharge apparatus of claim 1 comprising two snow discharge tubes each having a different internal diameter.

3. The carbon dioxide snow discharge apparatus of claim 1 wherein the at least two snow discharge tubes are parallel to each other, said apparatus comprising joining means for joining the at least two adjacent tubes to each other at selected points along the length of the tubes.

4. The carbon dioxide snow discharge apparatus of claim 3 wherein the joining means comprise welded brackets.

5. The carbon dioxide snow discharge apparatus of claim 1 wherein the expansion means comprises for each of said discharge tubes a nozzle having an orifice, each of said at least two discharge tubes having an internal diameter such that a ratio of the size of the orifice to the internal diameter of each of the at least two discharge tubes is from about 1:9 to 1:15.

6. The carbon dioxide snow discharge apparatus of claim 5 wherein the ratio of the size of the orifice to the internal diameter of each of the at least two discharge tubes is about 1:12.5.

7. The carbon dioxide snow discharge apparatus of claim 1 further comprising valve means for controlling a rate of flow of the liquid carbon dioxide to the expansion means.

8. The carbon dioxide snow discharge apparatus of claim 7 further comprising automatic control means for automatically controlling operation of the valve means.

9. The snow discharge apparatus of claim 1 wherein the apparatus is mounted on a motor vehicle, said apparatus further comprising a mast secured to the motor vehicle and at least one stay connected at one end to the mast and at an opposed end to at least one of the at least two discharge tubes.

10. A carbon dioxide snow discharge apparatus mounted on a motor vehicle comprising at least two snow discharge tubes adapted to be selectively operated either individually or in combination for discharging carbon dioxide snow therefrom, liquid carbon dioxide supply means, and expansion means for receiving liquid carbon dioxide and for expanding the liquid carbon dioxide to form carbon dioxide snow, a mast secured to the motor vehicle and at least one stay connected at one end to the mast and at an opposed end to at least one of the of the at least two discharge tubes.

* * * * *